United States Patent [19]

Takahashi et al.

[11] Patent Number: 5,214,114

[45] Date of Patent: May 25, 1993

[54] PROCESS FOR PRODUCING ETHYLENE POLYMERS

[75] Inventors: Tadashi Takahashi; Junji Mayumi; Yoichi Maeda, all of Yokkaichi, Japan

[73] Assignee: Mitsubishi Petrochemical Company Limited, Tokyo, Japan

[21] Appl. No.: 827,012

[22] Filed: Jan. 28, 1992

[30] Foreign Application Priority Data

Jan. 28, 1991 [JP] Japan ..................... 3-8393

[51] Int. Cl.$^5$ .................... C08F 2/06; C08F 4/656
[52] U.S. Cl. .................... 526/119; 526/125; 526/352; 502/116
[58] Field of Search ............ 526/125, 144, 119

[56] References Cited

U.S. PATENT DOCUMENTS 4,593,010 6/1986 Malpass ..................... 526/144
5,082,818 1/1992 Matsuura et al. .......... 526/125

FOREIGN PATENT DOCUMENTS 299712 1/1989 European Pat. Off. .
303704 2/1989 European Pat. Off. .
330255 8/1989 European Pat. Off. .

Primary Examiner—Joseph L. Schofer
Assistant Examiner—David Wu
Attorney, Agent, or Firm—Oblon, Spivak, McClelland, Maier & Neustadt

[57] ABSTRACT

A process for preparing an ethylene polymer which comprises polymerization of ethylene or ethylene and an α-olefin having 3 to 10 carbon atoms over a catalyst comprising the following components (A) and (B): (A) which is a solid component for a Ziegler catalyst obtained by bringing (2) into contact with (1) and bringing the contact product into contact with (3) and (4) wherein (1) is a solid catalyst component comprising (i)–(iii) where (i): $MgX_2$, (ii): titanium tetraalkoxide and/or a polytitanate ester, (iii): a polymeric silicon compound, having a formula of $$-\underset{\underset{H}{|}}{\overset{\overset{R^1}{|}}{Si}}-O-,$$

$R^1$ being a hydrocarbyl group, (2) is a halogenated Si compound; (3) is a halohydrocarbon; (4) is an organo-Al compound; and (B) is an organo-Al compound.

An ethylene polymer having a moderately broad molecular weight distribution can be prepared in a high activity by use of the catalyst. The ethylene polymer is suited for the production of fibers or tapes.

11 Claims, No Drawings

PROCESS FOR PRODUCING ETHYLENE POLYMERS

BACKGROUND OF THE INVENTION

1. Field of the Art

The present invention relates to a process for preparing ethylene polymers having a moderately broad molecular weight distribution.

2. Background Art

Ethylene polymers have different applications depending on their molecular weight distributions, and those having a broad molecular weight distribution is often used for hollow molded articles such as pipes or the like, those having a moderately broad molecular weight distribution for products such as fibers or tapes and those having a narrow molecular weight distribution for injection-molded articles such as bottle caps or buckets.

Hitherto, a solid catalyst component which is known to have a high activity and comprises a magnesium halide and a titanium halide gives generally an ethylene polymer having a narrow molecular weight distribution, and the solid catalyst component may thus be suited for the production of injection molded articles such as bottle caps or buckets but not for the production of the articles for the other applications described above.

In order to expand applications of ethylene polymers, the development of a catalyst which affords a polymer having a wide molecular weight distribution is required, and many inventions with use of a variety of transition metal compounds or with a method for support a catalyst component on an inorganic carrier have been described in, for example, Japanese Patent Publication Nos. 37037/1977, 8588/1978, 8006/1980, 45247/1982, 13084/1983 and 58364/1987.

The present inventors have already proposed a process for preparing solid catalyst components particularly suited for slurry polymerization or vapor phase polymerization wherein a component which is the same component (A-1) of the present invention which will hereinbelow be described in more detail is treated with (1) a silicon halide, (2) a titanium halide or (3) a titanium halide and a hydrogenpolysiloxane (e.g. Japanese Patent Laid-Open Publication Nos. 127706/1983, 285203/1986, 285204/1986, 285205/1986, 180612/1982, 5309/1983 and 5311/1983). These catalysts, notwithstanding their usefulness as they were, resulted in polymers having narrow molecular weight distributions or were still required to be improved in the standpoint of their catalyst activities.

They have also proposed the catalysts which are obtained by treating a component which is the same component (A-1) of the present invention with (1) an aluminium halide, (2) an aluminium halide and a titanium or silicon halide or (3) an organoaluminium compound or a hydrogenpolysiloxane and an aluminium halide (see e.g. Japanese Patent Laid-Open Publication Nos. 12903/1984 and 43007/1984). These catalysts may, however, have a problem to an industrial practice thereof because of the difficulty of transportation due to the handling of the solid aluminium halides and the corrosion of the apparatuses due to the aluminum halides, although they have relatively high activities and afford products having a wide molecular weight distribution.

Furthermore, they have also proposed the catalysts obtained by treating a component which is the same component (A-1) of the present invention with a titanium or silicon halide (e.g. Japanese Patent Laid-Open Publication No. 225104/1983). These catalysts, however, may not have very satisfactory activities and molecular weight distributions and improvement may thus be desired.

SUMMARY OF THE INVENTION

The object of the present invention is to provide in a high activity ethylene polymers having a moderately broad molecular weight distribution. Particularly, the present invention intends to achieve the object by the use of a particular catalyst.

The present invention presents a process for producing an ethylene polymer which comprises contacting an olefin which is ethylene or ethylene and up to 10 mole percent of the ethylene of an α-olefin having 3 to 10 carbon atoms with a catalyst thereby to polymerize the olefin, the catalyst comprising the following components (A) and (B):

Component (A) which is a solid component for a Ziegler catalyst obtained by bringing the following component (A-2) into contact with the component (A-1) and bringing the resulting contact product into contact with following components (A-3) and (A-4):

Component (A-1) which is a solid catalyst component comprising the following components (A-1-i), (A-1-ii) and (A-1-iii):

Component (A-1-i) which is a magnesium dihalide;

Component (A-1-ii) which is a titanium tetraalkoxide and/or a polytitanate ester;

Component (A-1-iii) which is a polymeric silicon compound having a structure represented by the formula:

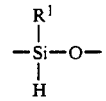

wherein $R^1$ represents a hydrocarbyl group;

Component (A-2) which is a silicon halide,

Component (A-3) which is a halohydrocarbon,

Component (A-4) which is an organoaluminium compound,

Component (B) which is an organoaluminium compound.

DETAILED DESCRIPTION OF THE INVENTION

Catalyst

The catalyst used in the present invention comprises the following components (A) and (B). The term "comprise" herein used means that the components are not restricted to the components described, that is, (A) and (B), but can include another appropriate component.

Component (A)

The component (A) is a solid component for a Ziegler catalyst obtained by bringing the following component (A-1) into contact with the component (A-2) and bringing the resulting contact product into contact with the following components (A-3) and (A-4). The term "obtained by bringing into contact with" refers to the products obtained by the contact of the compounds indicated and also to the products obtained by the contact of the compounds indicated with another appropriate compound.

Component (A-1)

(1) Constituents

The component (A-1) is a solid catalyst component comprising the following components (A-1-i), (A-1-ii) and (A-1-iii). The term "comprising" herein used means that the components are not restricted to the components described, that is, (A-1-i), (A-1-ii) and (A-1-iii), but can include another appropriate component.

The solid catalyst component is a solid composition which is different from a magnesium dihalide or a complex of magnesium dihalide with a titanium tetraalkoxide or a polytitanate ester. Although the solid composition has not been satisfactorily elucidated in the current situation, composition analysis tells that it contains titanium, magnesium, a halogen and silicon. The solid catalyst component (A-1) has in most cases a small specific surface area, generally in the range of 10 m²/g or less, the solid component (A) exhibits no characteristic peak of a magnesium dihalide upon X-ray diffraction and thus assumed to be a compound different from the magnesium dihalide X-ray crystallographically.

(1) Component (A-1-i)

This is a magnesium dihalide and specifically includes for example $MgF_2$, $MgCl_2$, and $MgBr_2$. Among them, $MgCl_2$ is preferable.

(2) Component (A-1-ii)

This is a titanium tetraalkoxide and/or a polytitanate ester.

Examples of the titanium tetraalkoxide include Ti(OC$_2$H$_5$)$_4$, Ti(O-iC$_3$H$_7$)$_4$, Ti(O-nC$_4$H$_9$)$_4$, Ti(O-nC$_3$H$_7$)$_4$, Ti(O-iC$_4$H$_9$)$_4$, Ti(O-C(CH$_3$)$_3$)$_4$, Ti(O-C$_5$H$_{11}$)$_4$, Ti(O-C$_6$H$_{13}$)$_4$, Ti(O-nC$_7$H$_{15}$)$_4$, Ti(O-C$_8$H$_{17}$)$_4$, Ti(O-C$_{10}$H$_{21}$)$_4$ and the like. Titanium tetraalkoxide having an alkyl group of 1 to 6 carbon atoms are preferable and an alkyl group of 3 to 6 carbon atoms are more preferable.

As the polytitanate ester, use is made of a compound represented by the formula:

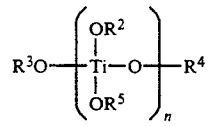

wherein R$^2$–R$^5$ represent independently a hydrocarbyl group, preferably having 1 to 20 carbon atoms, more preferably 1 to 6 carbon atoms, n denotes a degree of polymerization and a number of 2 or more, preferably 2 to 10. Examples of the polytitanate esters include tetra-n-butyl polytitanate where the polymerization degree is 2 to 10, tetra-n-hexyl polytitanate where the polymerization degree is 2 to 10 or tetraoctyl polytitanate where the polymerization degree is 2 to 10.

(3) Component (A-1-iii)

This polymeric silicon compound has as a repeating unit the structure represented by the formula:

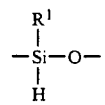

wherein R$^1$ represents a hydrocarbyl group having 1 to about 10 carbon atoms, particularly 1 to about 6 carbon atoms, preferably an alkyl group, a phenyl group and an alkyl-substituted phenyl group. Examples of the polymeric silicon compounds having such structural unit, include methylhydrogenpolysiloxane, ethylhydrogenpolysiloxane, phenylhydrogenpolysiloxane, cyclohexylhydrogenpolysiloxane and the like.

While the polymerization degree of the polymeric silicon compound is not specifically limited, the compound has preferably a viscosity in the range from 10 centistokes to about 100 centistokes in consideration of its handling. The hydrogenpolysiloxane is not affected largely by its terminal structure, but the terminal group is preferably protected by an inert group such as a trialkylsilyl group.

(2) Preparation

The component (A-1) can be prepared by contacting the aforementioned components (A-1-i) to (A-1-iii) with each other.

(1) Proportions

Although the amount of each component used can be at any level provided that the effect of the present invention is attainable, generally it is preferably in the following ranges.

The amount used of the titanium tetraalkoxide or the polytitanate ester (component (A-1-ii) (total amount when used in combination) may be in the range of 0.1 to 10 moles, preferably in the range of 1 to 4 moles, to the magnesium dihalide used (component (A-1-i)).

The amount used of the polymeric silicon compound (component (A-1-iii)) may be in the range of $1 \times 10^{-2}$ to 100 moles, preferably in the range of 0.1 to 10 moles, to the magnesium dihalide (component (A-1-i)).

(2) Contact method

The solid component (A-1) of the present invention is obtained by bringing the aforementioned three components (and an optional component if desired) into contact with each other. The contact of the three components can be carried out by any well-known methods. The three components may be generally contacted at a temperature in the range of $-100°$ C. to $+200°$ C. The contact time is generally 10 minutes to about 20 hours.

The aforementioned three components are preferably brought into contact under stirring or can be brought into contact by mechanical grinding with a ball mill, a vibration mill or the like. The sequence of the contact of the three components are optional provided that the effect of the present invention is attainable. In general, the magnesium dihalide and the titanium tetraalkoxide are brought into contact with each other and then with the polymeric silicon compound. The contact of the three components can also be carried out in the presence of a dispersing medium. As the dispersing medium in that case, there are mentioned hydrocarbons, halohydrocarbons, dialkylpolysiloxanes and the like. The specific examples of the hydrocarbons include hexane, heptane, toluene, cyclohexane and the like; the specific examples of the halohydrocarbons include n-butyl chloride, 1,2-dichloroethylene, carbon tetrachloride, chlorobenzene and the like; and the specific examples of the dialkylpolysiloxanes include dimethylpolysiloxane, methylphenylpolysiloxane and the like.

The contact of the three essential components can, if desired, be conducted in the presence of an alcohol and/or an organic acid ester added thereto in order to control the particle shape of the catalyst according to Japanese Patent Laid-Open Publication No. 80406/1984.

The solid component (A-1) may be washed with a solvent to remove unnecessary components or products such as the unreacted portions of the components (A-1-ii) and (A-1-iii) before contact with the components (A-2), (A-3) and (A-4). The solvent used for washing can be appropriately selected from the aforementioned dispersing media. Thus, the contact of the components (A-1-i) to (A-1-iii) in a dispersing medium can alleviate the washing operations.

Component (A-2)

The silicon halide as the component (A-2) is a compound represented by the general formula $R^6_m SiX_{4-m}$, wherein $R^6$ represents a hydrocarbyl group preferably having 1 to about 10 carbon atoms or a hydrocarbyloxy group preferably having 1 to about 10 carbon atoms, X represents a halogen atom, and m denotes an integer of 0 to 2. Preferable examples of the silicon halides include a tri or tetrahalogenated silicon where the m is 1 or 0, most preferably a tetrahalogenated silicon where the m is 0. The specific examples of the compound include $SiCl_4$, $CH_3SiCl_3$, $(C_2H_5)SiCl_3$, $(C_4H_9)SiCl_3$, $Ph\text{-}Si\text{-}Cl_3$ (Ph: phenyl), $(C_2H_5)_2SiCl_2$, $(C_2H_5)SiCl_3$, $(C_2H_5O)_2\text{-}SiCl_2$, $CH_3(C_2H_5O)SiCl_2$, $C_2H_5(C_2H_5O)SiCl_2$ and the like.

Component (A-3)

The halohydrocarbon as the component (A-3) has a structure of a hydrocarbon having 1 to 20 carbon atoms of which a part or the whole of the hydrogen atoms are substituted by a halogen atom. Specific examples include $CH_3Cl$, $CHCl_3$, $C_2H_5Cl$, $CH_2Cl\text{-}CH_2Cl$, $C_3H_7Cl$, $C_4H_9Cl$, $C_8H_{17}Cl$, $Ph\text{-}Cl$, $o\text{-}Ph'Cl_2$ (Ph': phenylene), $Ph\text{-}CH_2Cl_3$, $CFCl_3$, $CCl_4$, $CH_3Br$, $C_3H_7Br$, $C_4H_9Br$, $CH_3I$ and the like. Among them, $C_{1-6}$ alkyl halides such as $n\text{-}C_3H_7Cl$, $i\text{-}C_3H_7Cl$, $i\text{-}C_3H_7Br$, $n\text{-}C_4H_9Cl$, $i\text{-}C_4H_9Cl$, $sec\text{-}C_4H_9Cl$, $t\text{-}C_4H_9Cl$ and $n\text{-}C_4H_9Br$ are preferable and $C_{3-4}$ alkyl halides are more preferable.

Component (A-4)

The organoaluminium compound as the component (A-4) may be a compound represented by the formula $R^7_a(R^8O)_bAlX_{3-a-b}$, wherein $R^7$ and $R^8$ each represent a hydrocarbyl group of 1 to 12 carbon atoms, respectively, X represents a halogen atom, and a and b are: $0 < a < 3$ and $0 \leq b \leq 2$. These compounds can also be used in admixture of the two or more. In the present invention, organoaluminium halides are preferable. $C_{2-4}$ alkylaluminum chlorides are more preferable. Specific examples include $Al(CH_3)_3$, $Al(C_2H_5)_3$, $Al(iC_4H_9)_3$, $Al(C_6H_{13})_3$, $(CH_3)_2AlCl$, $(C_2H_5)_2AlCl$, $(iC_4H_9)_2AlCl$, $(C_2H_5)_{3/2}AlCl_{3/2}$, $(CH_3)AlCl_2$, $(C_2H_5)AlCl_2$, $i\text{-}C_4H_9AlCl_2$, $(C_2H_5)_2Al(OC_2H_5)$, $(C_2H_5)Al(OC_2H_5)Cl$, $(C_4H_9)Al(OC_4H_9)Cl$, $(C_2H_5)_2AlBr$, $C_2H_5AlI$ and the like.

Synthesis of Component (A)

The component (A) is synthesized by bringing the component (A-2) into contact with the component (A-1) and then bringing the components (A-3) and (A-4) into contact with the contact product, preferably synthesized by sequentially bringing stepwise the components (A-2) to (A-4) into contact with the component (A-1).

(1) Proportions

Although the amount of each component used can be at any level provided that the effect of the present invention is attainable, generally it is preferably in the following ranges.

The amount used of the component (A-2) may be in the range of 0.01 to 20 moles, preferably 0.1 to 10 moles, more preferably 1 to 10 moles, per 1 mole of Ti in the component (A-1).

The amounts used of the components (A-3) and (A-4) are in the range of 0.1 to 20 moles, preferably 0.5 to 10 moles, more preferably 1.5 to 7 moles, respectively, per 1 mole of Ti in the solid component after treatment with the component (A-2).

(2) Contact method

The contact of the components (A-2) to (A-4) with the component (A-1) is generally conducted in either stages at a temperature in the range of $-50°$ C. to $+200°$ C. for a period in the range from 5 minutes to 20 hours.

The components are preferably brought into contact under stirring or can be brought into contact by mechanical grinding with a ball mill, a vibration mill or the like, but preferably in the presence of a dispersing medium. As the dispersing medium in that case, a medium listed for use for the preparation of the component (A-1) can be used.

After the reaction of the components (A-1) and (A-2), unnecessary ingredients in the dispersing medium is generally removed. As for the components (A-3) and (A-4), a method for removing the unnecessary components after continuous reaction without removing the unnecessary components is generally used.

Component (B)

The component (B) is an organoaluminium compound. In the present invention, a trialkylaluminium, particularly the one having 1 to 12 carbon atoms in the alkyl group is preferably used. Specific examples include $Al(CH_3)_3$, $Al(C_2H_5)_3$, $Al(iC_4H_9)_3$, $Al(C_6H_{18})_3$, isoprenylaluminium and the like. An organoaluminium compound represented by the formula $R^9_cAlX_{3-c}$, wherein $R^9$ represents a hydrocarbyl group having 1 to 12 carbon atoms, X represents a halogen atom or a hydrocarbyloxy group preferably having 1 to about 12 carbon atoms, and c denotes 1 or 2, can also be used in combination with the trialkylaluminium. Specific examples of the organoaluminium compound include $(CH_3)_2AlCl$, $(C_2H_5)_2AlCl$, $(iC_4H_9)_2AlCl$, $(C_2H_5)_2Al(OC_2H_5)$, $(i\text{-}C_4H_9)_2Al(OC_2H_5)$, $(C_2H_5)_2Al(OiC_4H_9)$, $(C_2H_5)_{1.5}AlCl_{1.5}$, $(C_2H_5)AlCl_2$, $i\text{-}C_4H_9Al(OC_2H_5)_2$, $i\text{-}C_4H_9Al(OC_4H_9)_2$, $(C_2H_5)_2AlB_4$, $(C_2H_5)_2AlI$, and the like. An alumoxane prepared by the reaction of a trialkylaluminium compound and $H_2O$ can also be used.

Polymerization of Ethylene

Polymerization of ethylene and of ethylene with up to 10 molar % of an α-olefin having 3 to 10 carbon atoms, preferably up to 10 mole % when the α-olefin has 3 to 4 carbon atoms and preferably up to 5 mole % when the α-olefin has 5 to 10 carbon atoms, is performed by the slurry polymerization, the vapor phase polymerization or the solution polymerization methods, and it is applied to continuous polymerization or batch-wise polymerization or to the mode in which pre-polymerization is conducted. As the solvent in the case of slurry polymerization, a hydrocarbon such as butane, pentane, hexane, heptane, cyclohexane, benzene, toluene or the like is used. Polymerization temperature is in the range of room temperature to 200° C., preferably in the range of 50° to 150° C. Molecular weight of the resulting polymers is controlled, as well-known, generally by means of hydrogen gas.

The ethylene polymers of the present invention thus obtained has a moderately broad molecular weight distribution. In other words, the ratio of the melt indices of the ethylene polymer of the present invention at the loads of 10 kg and of 2.16 kg (ASTM D-1238-73), FR, is about 8.4 or more, particularly 9.0 or more, upper limit being about 12.

EXAMPLE 1

(1) Synthesis of component (A-1)

Into a flask having an internal diameter of 10 cm which had been sufficiently purged with nitrogen was introduced 100 ml of n-heptane, followed by 0.1 mole of $MgCl_2$ and 0.2 mole of $Ti(O-nC_4H_9)_4$, and the mixture was reacted at 95° C. for 1 hour. The impeller used at the time has a diameter of 6 cm. After the reaction was completed, the reaction mixture was cooled to 40° C. and 15 ml of methylhydrogenpolysiloxane was introduced into the mixture to conduct reaction at a stirring rate of 20 rpm for 3 hours.

After the reaction was completed, solids obtained was washed with n-heptane and a portion of the solid was removed to measure the average particle diameter of the solid by the sedimentation method. The average particle diameter was 24.5 μm, and the ratio of supported Ti was 13.5% by weight.

(2) Reaction of component (A-1) and component (A-2)

In 500 cc flask which had been sufficiently purged with nitrogen was placed the above-described component (A-1), and heptane was added to adjust the total volume to 330 cc. An amount of 36 cc of $SiCl_4$, molar ratio to Ti being 1.86, was added dropwise over a period of 20 minutes at 30° C. After the reaction was carried out for 60 minutes, the temperature was raised up to 90° C. and the reaction was continued for further 3 hours. Then, the reaction mixture was sufficiently washed with heptane. The ratio of supported Ti was 3.31% by weight.

(3) Reaction of component (A-3) and component (A-4)

In a 300 cc flask which had been sufficiently purged with nitrogen was placed the reaction product of the above-described components (A-1) and (A-2), and heptane was added so that the total volume was 50 cc. An amount of 0.45 cc of $t-C_4H_9Cl$, molar ratio to Ti being 2.0, was added, and a solution of 0.27 g of $C_2H_5AlCl_2$, molar ratio to Ti being 1, in 20 cc of heptane was further added dropwise over a period of 20 minutes. The temperature was then raised up to 50° C., and the reaction was continued for further 2 hours. The reaction mixture was then washed sufficiently with heptane. The ratio of supported Ti was 2.74% by weight.

(4) Polymerization of ethylene

Into a stainless steel autoclave having an internal volume of 1.5 liters and equipped with a stirrer and a temperature controller was introduced 800 ml of sufficiently dehydrated and deoxygenated n-heptane, followed by 100 mg of triethylaluminium and 5 mg of the catalyst component synthesized above.

The temperature was raised up to 90° C., and 3 $kg/cm^2$ in a partial pressure of hydrogen and then 6 $kg/cm^2$ of ethylene were introduced so that the total pressure was 9 $kg/cm^2 \cdot G$. Polymerization was conducted for 2 hours. These reaction conditions were maintained during the polymerization. After the polymerization was completed, ethylene and hydrogen were purged, and the content was removed from the autoclave. The polymer slurry was filtered and dried overnight. The polymer was obtained in a yield of 214 g, yield of polymer per solid catalyst, PY, being 43,000 g-PE/g-solid catalyst, MI (melt index at a load of 2.16 kg) being 2.54, FR (ratio of MI at a 10 kg load and MI at a 2.16 kg load which is a scale of molecular weight distribution; the larger the FR, the wider the molecular weight distribution) being 9.5.

EXAMPLES 2-9, COMPARATIVE EXAMPLE 1

The component (A-1) was used which was prepared in the same manner as in Example 1, and a halohydrocarbon as the component (A-3) and an organoaluminium compound as the component (A-4) were added in amounts shown in Table 1 to synthesize the component (A) in the same manner as in Example 1. The results of polymerization conducted in the same manner as in Example 1 was listed in Table 1.

Also, the performances of a solid catalyst which was not treated with the components (A-3) and (A-4) and obtained by the reaction until that with the component (A-2) was illustrated in Comparative Example 1. In this case, a narrower molecular weight distribution as compared with the catalyst of the present invention is afforded.

EXAMPLE 10

With the catalyst used in Example 9, copolymerization of ethylene and hexene was conducted. The procedure in Example 1 was repeated except that the temperature was changed to 65° C., the hydrogen partial pressure to 2 $kg/cm^2$ and the total pressure to 8 $kg/cm^2$ and that 15 cc of hexene was added. The polymer was obtained in a yield of 143 g, PY being 29,000; MI being 1.3; FR being 8.8; density being 0.947.; hexene content being 0.8% by mole.

TABLE 1

| | Halohydrocarbon | | Organo-Al compound | | Ti in solid catalyst (% by weight) | Polymer Yield (g) | PY (g-PE/g-solid) | MI (g/10 min) | FR |
|---|---|---|---|---|---|---|---|---|---|
| | Name | Hy/Ti (molar ratio) | Name* | Org.Al/Ti (molar ratio) | | | | | |
| Example 2 | $CHCl_3$ | 2 | EADC | 1 | 3.24 | 205 | 41,000 | 3.24 | 9.0 |

TABLE 1-continued

| | Halohydrocarbon | | Organo-Al compound | | Ti in solid catalyst (% by weight) | Polymer Yield (g) | PY (g-PE/ g-solid) | MI (g/- 10 min) | FR |
|---|---|---|---|---|---|---|---|---|---|
| | Name | Hy/Ti (molar ratio) | Name* | Org.Al/Ti (molar ratio) | | | | | |
| Example 3 | dichlorobenzene (Cl, Cl on ring) | 5 | EADC | 1 | 3.87 | 227 | 45,000 | 1.88 | 8.8 |
| Example 4 | t-C$_4$H$_9$Cl | 2 | DEAC | 1 | 3.70 | 229 | 46,000 | 2.6 | 9.1 |
| Example 5 | dichlorobenzene (Cl, Cl on ring) | 5 | DEAC | 1 | 4.36 | 178 | 36,000 | 1.96 | 8.8 |
| Example 6 | 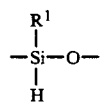 | 5 | TEA | 1 | 4.30 | 155 | 31,000 | 1.89 | 8.4 |
| Example 7 | t-C$_4$H$_9$Cl | 5 | EADC | 1 | 3.1 | 200 | 40,000 | 2.0 | 9.1 |
| Example 8 | t-C$_4$H$_9$Cl | 8 | EADC | 1 | 1.9 | 220 | 44,000 | 2.1 | 9.3 |
| Example 9 | t-C$_4$H$_9$Cl | 5 | EADC | 3 | 1.3 | 141 | 28,000 | 0.75 | 10.1 |
| Comparative Example 1 | None | — | None | — | 3.31 | 65 | 13,000 | 1.76 | 8.1 |

*EADC represents (C$_2$H$_5$)AlCl$_2$, DEAC represents (C$_2$H$_5$)$_2$AlCl, and TEA represents Al(C$_2$H$_5$)$_3$.

What is claimed is:

1. A process for producing an ethylene polymer which comprises contacting an olefin which is ethylene or ethylene and up to 10 mole percent of the ethylene of an α-olefin having 3 to 10 carbon atoms with a catalyst thereby to polymerize the olefin, the catalyst consisting of components (A) and (B):

Component (A) which is a solid component for a Ziegler catalyst obtained by bringing component (A-2) into contact with component (A-1) and bringing the resulting contact product with components (A-3) and (A-4) wherein:

Component (A-1) which is a solid catalyst component obtained by contacting each of the following components (A-1-i), (A-1-ii) and (A-1-iii):

Component (A-1-i) which is a magnesium dihalide;

Component (A-1-ii) which is a titanium tetraalkoxide and/or a polytitanate ester; and Component (A-1-iii) which is a polymeric silicon compound having a structure represented by the formula:

$$-\underset{\underset{H}{|}}{\overset{\overset{R^1}{|}}{Si}}-O-$$

wherein R$^1$ represents a hydrocarbyl group;

Component (A-2) which is a silicon halide;

Component (A-3) which is a halohydrocarbon; and

Component (A-4) which is an organoaluminum halide; and

Component (B) which is an organoaluminum compound.

2. The process as claimed in claim 1, wherein the titanium tetraalkoxide as the Component (A-1-ii) has an alkyl group of 1 to 6 carbon atoms, and the polytitanate ester as the Component (A-1-ii) is esterified with an alkyl group of 1 to 6 carbon atoms and its degree of polymerization is 2 to 10.

3. The process as claimed in claim 1, wherein the polymeric silicon compound as the Component (A-1-iii) has the moiety R of 1 to 10 carbon atoms and a viscosity of 10 to 100 centistokes.

4. The process as claimed in claim 1, wherein the Component (A-1) is prepared by contacting the Components (A-1-i), (A-1-ii) and (A-1-iii) at a temperature of −100° C. to +200° C. for 10 minutes to 20 hours, in the proportion such that the mole proportions to the Component (A-1-i) of the Component (A-1-ii) is 0.1 to 10 and of the Component (A-1-iii) is 1×10$^{-2}$ to 100, at a temperature of −100° C. to +200° C. for 10 minutes to 20 hours.

5. The process as claimed in claim 1, wherein the silicon halide as the Component (A-2) has a formula of R$^6_m$SiX$_{4-m}$ wherein R$^6$ represents a hydrocarbyl group of 1 to 10 carbon atoms or a hydrocarbyloxy group of 1 to 10 carbon atoms, X represents a halogen atom, and m denotes an integer of 0 to 2.

6. The process as claimed in claim 1, wherein the halohydrocarbon as the Component (A-3) is a C$_1$–C$_{20}$ hydrocarbyl halide.

7. The process as claimed in claim 1, wherein the organoaluminum halide is a C$_{2-4}$ alkylaluminum chloride.

8. The process as claimed in claim 1, wherein the Component (A) is prepared by contacting the Components (A-1) with (A-2) and, then with the Components (A-3) and (A-4), in proportions of the Component (A-2) of 0.01 to 20 moles per mole of Ti in the Component (A-1) and of the Components (A-3) and (A-4) of 0.1 to 20 moles, respectively, per mole of Ti of the product of contact of the Components (A-1) and (A-2), at a temperature of −50° C. to +200° C. for 5 minutes to 20 hours under stirring.

9. The process as claimed in claim 8, wherein the contacting is conducted in a dispersing media.

10. The process as claimed in claim 1, wherein the organoaluminium compound as the Component (B) is selected from the group a trialkylaluminium of 1 to 12 carbon atoms in each of the alkyls and a mixture of a trialkylaluminium of 1 to 12 carbon atoms in each of a formula $R^9{}_c AlX_{3-c}$ wherein $R^9$ represents a hydrocarbyl group of 1 to 12 carbon atoms, X represents a halogen atom or a hydrocarbyloxy group of 1 to 12 carbon atoms, and c is 1 or 2.

11. The process as claimed in claim 1, wherein the ethylene polymer produced has the ratio of the melt index according to ASTM D-1238-73 under the load of 10 kg and that under the load of 2.16 kg of 8.4 to 12.

* * * * *

UNITED STATES PATENT AND TRADEMARK OFFICE
CERTIFICATE OF CORRECTION

PATENT NO. : 5,214,114
DATED : May 25, 1993
INVENTOR(S) : Tadashi TAKAHASHI, et al.

It is certified that error appears in the above-identified patent and that said Letters Patent is hereby corrected as shown below:

Column 9, line 41, insert "into contact" after "product".

Column 10, lines 46, 47, 48, Delete comma (,) after "100" and insert a period (.). Delete --at a temperature of -100° C to +200°C for 10 minutes to 20 hours--.

Signed and Sealed this

Fourth Day of November, 1997

*Attest:*

BRUCE LEHMAN

*Attesting Officer*       *Commissioner of Patents and Trademarks*